United States Patent
Bovington

[11] Patent Number: 5,904,847
[45] Date of Patent: May 18, 1999

[54] SEPTIC TANK WASTE WATER FILTER

[76] Inventor: Tom Bovington, P.O. Box 670, Helena, Mont. 59624

[21] Appl. No.: 09/144,490

[22] Filed: Aug. 31, 1998

[51] Int. Cl.$^6$ .............................. B01D 36/04; B01D 29/33
[52] U.S. Cl. ...................... 210/416.1; 210/460; 210/462; 210/532.2; 210/295; 210/299
[58] Field of Search ................................ 210/416.1, 449, 210/460, 462, 532.2, 295, 299

[56] References Cited

U.S. PATENT DOCUMENTS

| | | |
|---|---|---|
| 2,627,979 | 2/1953 | Lamb . |
| 2,775,348 | 12/1956 | Williams . |
| 4,439,323 | 3/1984 | Ball . |
| 5,409,604 | 4/1995 | Graves . |
| 5,445,738 | 8/1995 | Fry . |
| 5,492,635 | 2/1996 | Ball . |
| 5,545,318 | 8/1996 | Richmond . |
| 5,582,716 | 12/1996 | Nurse . |
| 5,591,331 | 1/1997 | Nurse . |
| 5,635,064 | 6/1997 | Bovington . |
| 5,690,824 | 11/1997 | Suth . |
| 5,762,790 | 6/1998 | Zoeller . |

Primary Examiner—Thomas M. Lithgow
Attorney, Agent, or Firm—Jerry Johnson

[57] ABSTRACT

A waste water filter for use within a septic tank. The waste water filter comprises a shield including an upstanding peripheral wall, the peripheral wall defining a shield interior within the shield. The shield further includes an inlet opening for allowing the entry of unfiltered wastewater into the shield interior. A filter enclosure is disposed within the shield interior at a spaced apart distance from the shield. The filter enclosure includes an upstanding peripheral wall, a top end, and a bottom end. The bottom end includes a bottom panel for preventing the passage of unfiltered waste water into filter enclosure. The filter enclosure further includes at least one filter surface disposed intermediate the top and bottom ends of the filter enclosure for allowing the passage of water restricting the passage of solids. A filter support is disposed intermediate the top and bottom ends of the filter enclosure adjacent to the filter surface and provides a supporting reinforcement surface for the filter surface during the filtering of waste water to prevent the filter surface from collapsing inwardly away from the shield. The filter support includes at least one opening therein for the passage of filtered waste water into filter enclosure. An outlet is disposed within the filter enclosure for discharging filtered waste water. The filter surface is typically disposed in a substantially vertical orientation and the filter support is typically disposed inside of the filter surface within the filter enclosure.

17 Claims, 6 Drawing Sheets

SEPTIC TANK WASTE WATER FILTER

BACKGROUND

In rural areas septic tanks in conjunction with drain fields are utilized to handle and treat residential wastewater. Septic tanks typically comprise a concrete or plastic container that receives incoming waste water or influent from the sewage drains of the residence it serves. The septic tank incorporates biologically active agents to aerobically and anaerobically digest the waste constituents of the influent that enters the tank. The digestion process causes waste particles or solids once digested to precipitate to the floor of the septic tank and form a sediment referred to as sludge. On the surface of the waste water within the tank a layer of scum forms that includes a high grease content which is unable to be dissolved into the waste water. Biological agents in the scum layer digest the waste particles in this layer which causes these particles to precipitate to the sludge layer at the bottom of the tank. A so called clear zone separates the scum layer and the sludge layer in the tank. The so called clear zone is relatively clear of suspended solid waste particles but includes particles precipitating to the bottom of the tank as the density of the particles undergoes changes during digestion. Sludge gasification further causes bubbles to form in the sludge layer which when rising to the surface also carry particles with them.

Traditionally, relatively clear waste water is discharged as effluent from the clear zone of the tank into piping that carries the effluent to a drain field or leach field. The drain field typically comprises a highly porous bed of gravel, sand or other coarse and fine aggregates. The drain field is usually disposed underground below the level of the septic tank but at a depth above the groundwater level. The drain field is efficient in allowing the wastewater to leach or percolate into the ground and eventually into the groundwater. Water leaching through the porous drain field is further filtered of solids by the gravel and sand of the drain field. Additional aerobic and anaerobic digestion of solids occurs in the drain field. By the time the wastewater has reached the groundwater supply it has been treated by the digestion process within the septic tank and from the filtering effect of the drain field.

The quality of wastewater that is permitted to enter the groundwater supply is stringently regulated in some areas to minimize the negative environmental effects that are associated with poorly treated wastewater entering the groundwater supply. These regulations have necessitated improvements to the traditional septic tank and drain field residential waste water handling system. Furthermore, as solid waste particles are discharged unintentionally from the septic tank to the drain field, the porous structure of the drain field has a tendency to become clogged with these solids thus diminishing the drainage capabilities of the drain field. Improvements have been incorporated into the traditional septic tank and drain field designs to minimize the amount of solids that are discharged into a drain field to thus insure a maximum drainage efficiency.

The two goals of maximum drain field drainage efficiency and minimum environmental impact have been best achieved in the past by the incorporation of a filter device placed in the septic tank to filter effluent leaving the tank. This filter, once utilized, insures that a minimum of untreated solid waste particles are discharged from the tank into the drain field. Additionally, maximum drain field drainage efficiency has been further advanced by the use of an incremental discharge apparatus such as a dosing siphon or pump to discharge the effluent from the tank to the drain fields. The use of an incremental discharge apparatus further necessitated the use of a filter to minimize the clogging effects of solids on the devices. Incremental discharge apparatus provide the benefit of discharging a large volume of water from the tank at spaced time increments. This type of discharge has a cleansing effect on solids accumulating within piping and within the drain field, as well.

These previous attempts at filtering the effluent that is discharged from a septic tank into a drain field have been successful in limiting the amount of untreated solid waste particles exiting the septic tank. Nevertheless, previous effluent filters had inherent inefficiencies due to their construction. Previous effluent filters are often of a design that utilizes a single filtering surface that is constructed into an enclosure and then mounted within a housing or shield. This filter design typically further incorporates a pump or other discharge apparatus that is maintained within the interior of the filter to permit the incremental discharge of filtered waste water to the drain field.

A first deficiency of the previously mentioned existing filter design is the tendency of the filter enclosure to collapse during the filtering process. The pump or dosing siphon acts to discharge the filtered water within the filter enclosure through an outlet where the water will eventually proceed to a sand filter or a drain field. The operation of the pump or dosing siphon results in suction forces, which pull inwardly on the filter enclosure. Additionally, water pressure outside the filter enclosure pushing inward on the filter enclosure also causes the filter enclosure to collapse.

Existing filters have experienced collapsing within the filter enclosures of the filters due to a design that increases the forces causing collapse, while offering little in the way of filter enclosure reinforcement.

Specifically, existing designs use relatively small inlets within the filter housing that result in high water speeds entering the housing which increases the forces pushing on the filter enclosure encouraging collapse of the enclosure. In addition to these undesirable added forces, the water entering the housing is also entering at a speed which is sufficient to pull solids into the housing, causing a build up of solids on the filter surfaces of the filter enclosure. The build up of solids on the filter surfaces limits the rate of the entry of water into the filter enclosure, which promotes collapse of the filter enclosure. The build up of solids may also contribute to collapse by providing a contact surface which water entering the filter housing interior will contact before preceding to the remaining openings within the filter surface.

The collapse or partial collapse of the filter enclosure can result in major operational problems for the filter, as well as in smaller operational inefficiencies that effect overall septic system performance. The most significant effect that collapse can cause is the entry of undigested solids from within the septic tank into the filter enclosure where the solids can plug and ruin the pump. Should the solids be discharged through the outlet by a pump or dosing siphon, the solids could plug outlet lines, sand filter distribution lines, the sand filter bed, or the drain field. Excess accumulation of solids within any of these septic system elements may cause the necessity of expensive repairs. Also possible is the discharge of undigested biological waste material that poses a health hazard to drinking water or to other ground water sources.

A second deficiency of the previous filter design is the lack of self cleaning properties. Solid waste particles that enter the housing are subject to digestion but are unlikely to be removed from the housing due to the absence of an outlet for solids that are drawn into the housing. The accumulation of solid waste particles will cause the inefficient operation of the filter, and eventually will cause the entire filter to plug which can ruin the pump if the problem is not detected immediately. This accumulation is also problematic during routine maintenance of the filter. A filter with a large amount of solids accumulation can plug drainage check valves which prevents the drainage of water from the filter during removal of the filter from the septic tank. The filter in this situation is extremely heavy and very difficult to remove from the septic tank for inspection. Accumulated solids, of course, add further weight to the filter.

A third deficiency in the previous waste water filter design has been the inability to back flush the filter. This feature is a necessity considering the inherent tendency of the previous filter designs to clog with solid particles quite easily. The inability to back flush the filter in a simple manner also results in expensive labor costs to the septic tank owner when the filter eventually plugs.

In lieu of the deficiencies of previous effluent filter designs there is clearly a need for a filter that: includes a filter enclosure that will not collapse under any circumstance, minimizes the clogging effects of accumulating solid waste particles on the filter surface by providing self cleaning characteristics to the filter which minimizes costly maintenance, and can be easily back flushed.

SUMMARY

The present invention is drawn to a waste water filter that satisfies the aforementioned needs. The waste water filter of the present invention comprises a filter for use within a septic tank. The waste water filter comprises a shield including an upstanding peripheral wall, the peripheral wall defining a shield interior within the shield. The shield further includes an inlet opening for allowing the entry of unfiltered wastewater into the shield interior. A filter enclosure is disposed within the shield interior at a spaced apart distance from the shield. The filter enclosure includes an upstanding peripheral wall having a top and a bottom end. The bottom end includes a bottom panel for preventing the passage of unfiltered waste water into filter enclosure. The filter enclosure further includes at least one filter surface disposed intermediate the top and bottom ends of the filter enclosure for allowing the passage of water while restricting the passage of solids. A filter support is disposed intermediate the top and bottom ends of the filter enclosure adjacent to the filter surface and provides a supporting reinforcement surface for the filter surface during the filtering of waste water to prevent the filter surface from collapsing inwardly away from the shield. The filter support includes at least one opening therein for the passage of filtered waste water into filter enclosure. An outlet is disposed within the filter enclosure for discharging filtered waste water.

The filter surface is typically disposed in a substantially vertical orientation and the filter support is typically disposed inside of the filter surface within the filter enclosure. A second filter support intermediate the filter support and the filter surface may be included for maintaining a distance between the filter support and the filter surface.

The filter enclosure in one version of the invention comprises a filter surface including a peripheral vertical wall. The filter support in this version typically includes a peripheral vertical wall disposed within the filter surface within the filter enclosure.

In another version of the waste water filter a filter surface is disposed within each of the openings and is supported along the periphery of the opening.

The shield of the waste water filter may typically include a substantially open bottom. The substantially open bottom is an inlet for the entry of unfiltered waste water into the shield interior. Additionally, the bottom panel of the filter inclosure may include a filter surface for allowing the passage of filtered waste water into the filter enclosure through the bottom panel.

The waste water typically further includes discharging means in fluid communication with the outlet. The discharging means may be a pump or may be a dosing siphon.

In another version of the waste water filter the filter enclosure includes an upstanding peripheral wall, a top end, and a bottom end. The filter enclosure further includes a filter support disposed intermediate the top and bottom ends of the filter enclosure. The filter support is adjacent to the filter surface and provides a supporting reinforcement surface for the filter surface during the filtering of waste water to prevent the filter surface from collapsing inwardly away from the shield. The filter enclosure in this version further includes a vertical peripheral wall separated into top, bottom, and center wall sections. The top and bottom sections begin at the top and bottom ends of the filter enclosure and are disposed toward the center section, with the central section including at least one filter surface for allowing the passage of water restricting the passage of solids. The filter support in this version comprises the top and bottom sections. The top and bottom sections are typically impervious to the passage of water. Vertical support sections intermediate the top and bottom sections may also be included that connect the top and bottom sections.

The present invention provides benefits that have been unrealized by previous waste water filter designs.

A first advantage of the present invention is provided by the inclusion of a filter support adjacent to the filter surface within the filter enclosure to ensure that the filter surfaces of the entire filter enclosure will not have a tendency to collapse during filtering operations. In particular, the filter support ensures that the forces resulting from water rushing into the filter shield interior and contacting the surfaces of the filter enclosure during and after the operation of a pump or dosing siphon, in combination with suction forces caused by pump or dosing siphon operation, will not cause the filter enclosure to collapse. The inward collapse of the filter surface is most likely after prolonged operation of the filter which results in the accumulation of solids on the filter surface.

By properly supporting the filter enclosure the present invention ensures efficient trouble free operation of the waste water filter. As previously stated, filter enclosure collapse may cause the failure of filter elements which are highly stressed during collapse. Other problems known to be caused by filter enclosure collapse are increased pump operation causing premature pump failure and the potential of plugging in all elements of the septic system if filter enclosure collapse causes unfiltered waste water to enter the filter enclosure. The waste water filter of the present invention prevents all of these potential problems from occurring.

The present invention further addresses the need for a waste water filter that minimizes the clogging effect of accumulating solid waste particles on the filter by providing the accumulating particles a means to exit the filter once the particles become digested by the biological activity within the septic tank. In this way, the present invention further addresses the need for a waste water filter to be self cleaning. Specifically, the waste water filter of the present invention utilizes a shield and filter arrangement wherein the shield is typically constructed with essentially an open bottom. As particles become dislodged from the filter surfaces during digestion the particles are permitted to precipitate out of the first and second interior locations and out the bottomless shield, as well. These particles will then precipitate to the sludge layer at the bottom of the tank. The obvious benefit of this feature is that the filter utilized in the present invention will remain at a high efficiency due to the minimizing of accumulated solids on the filter surface. Other benefits of a self cleaning filter are decreased maintenance costs necessary to clean out or replace a clogged filter.

The present invention still further provides the benefit heretofore unrealized by previous waste water filter designs of being easily back flushed. Clean water that is forced into the filter enclosure will advance through the filter surfaces of the filter inclosure and progress out the shield. This back flush flow will remove a substantial portion of the accumulated solids from the filter surfaces and from interior locations within the shield. Essentially no disassembly of the system would be required by this operation and the open bottom of the shield would insure that dislodged particles would be permitted to be removed from the shield where they would precipitate to the sludge layer. This back flush procedure would be simple enough to be performed by an unskilled person. The benefit of this feature would be a further reduction in maintenance costs as no specialized labor would be required to perform the cleaning of the filter.

In addition to the previously described benefits the waste water filter of the present invention further provides the benefit of being very simple in construction and utilized materials and supplies already in the marketplace. The waste water filter of the present invention is extremely durable even though very few materials are necessary for its manufacture. As an example, the shield utilized does not require a top as no damage will occur if an overflow occurs into the interior of the shield. The waste water filter requires a minimum of materials to manufacture, is durable in construction, and is essentially maintenance free but allows simple maintenance to be performed by the user when necessary.

These and other advantages of the present invention will become apparent upon inspection of the accompanying specification, claims and drawings.

DRAWINGS

DESCRIPTION

Figure 1:
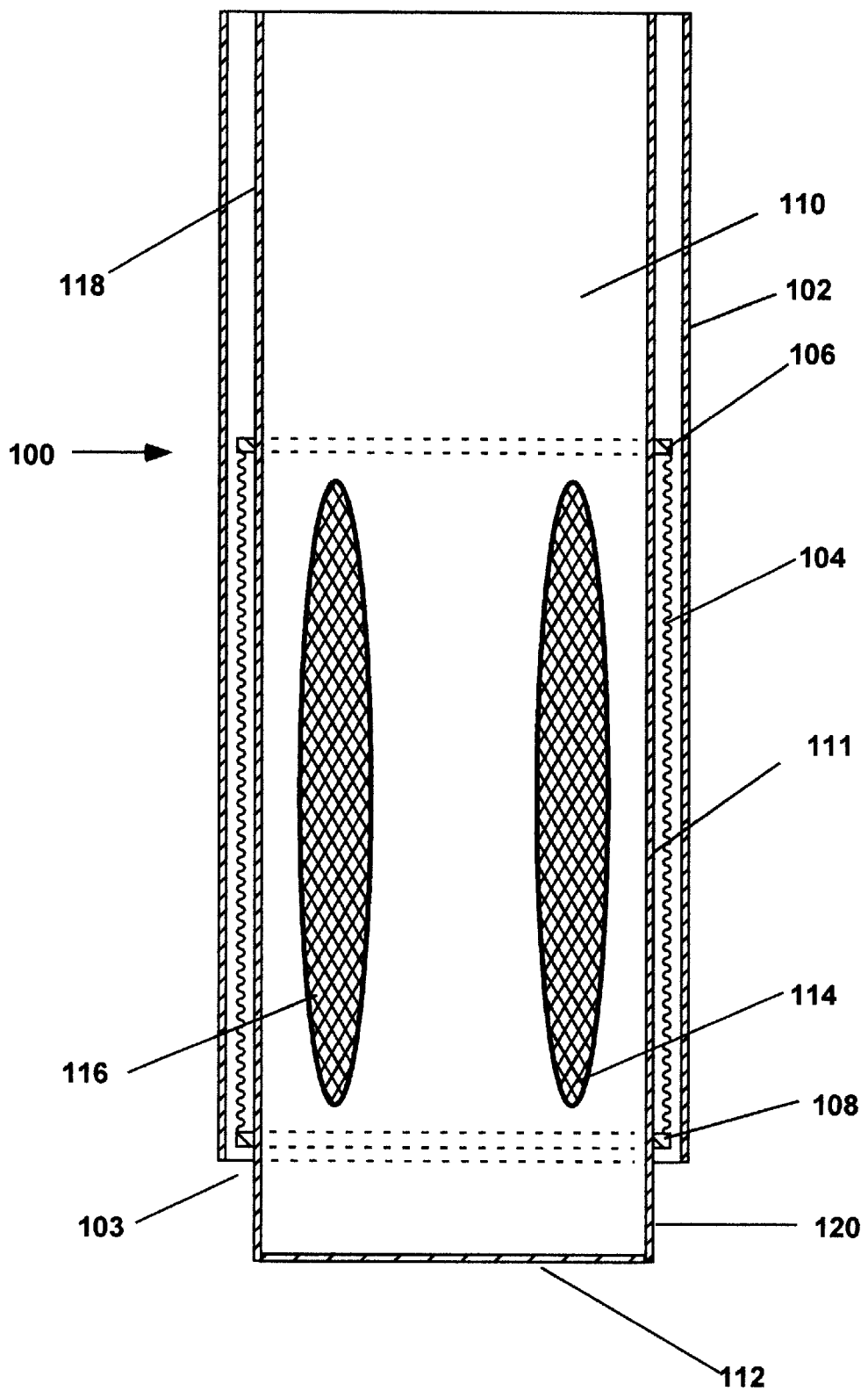
FIG. 1 is a cross-sectional side view of a first version of the waste water filter of the present invention.

FIG. 1 illustrates in cross section a first version of the waste water filter 100 of the present invention. As shown in this figure, the waste water filter 100 includes a shield 102, and a filter enclosure disposed within the shield interior. The filter enclosure comprises a filter surface 104 and a filter support 110.

In greater detail, the shield 102 includes an inlet 103 for allowing the entry of unfiltered waste water into the shield interior. The filter surface 104 of the filter enclosure comprises an upstanding peripheral cylindrical wall of filtering material which in this figure is a plastic mesh screen. The filter surface 104 is typically attached to a center section of a filter support 110 by attachment rings 106 and 108. The filter support 110 in this figure is inside the filter surface and comprises an upstanding peripheral wall 111 typically of rigid plastic material. The filter support is disposed adjacent the filter surface for preventing the inward collapse of the filter surface 104. The filter support includes a top wall section 118 including a top end, a bottom wall section 120 including a bottom end which includes a bottom panel 112, and at least one opening within a center section intermediate the top and bottom ends for the entry of filtered waste water into the filter enclosure. In this cross sectional figure, two openings 114 and 116 are shown in the filter support. The two openings 114 and 116 are disposed within a center wall section intermediate the top and bottom wall sections of the filter enclosure. A vertical support section is located in the area between the openings.

The vertical peripheral walls of the shield 102, the filter surface 104, and the filter support 111 are all cylindrical in shape in this version of the waste water filter. Cross sectional shapes other than round could also have been used in any or all of these elements, however. A gap is maintained between the filter surface peripheral wall 104 and the interior surface of the shield peripheral wall for allowing the entry of unfiltered waste water, which has passed through inlet 103, into the shield interior. The inlet is defined by the annular gap existing between the open bottom of the upstanding peripheral wall of the shield 102 and the bottom ring 108 which attaches the filter surface 104 to the filter support 110. If the ring 108 were located at a high vertical position in relation to the bottom of the shield, then the inlet would be the annular gap between the shield 102 and the filter support peripheral wall 111.

Figure 2:
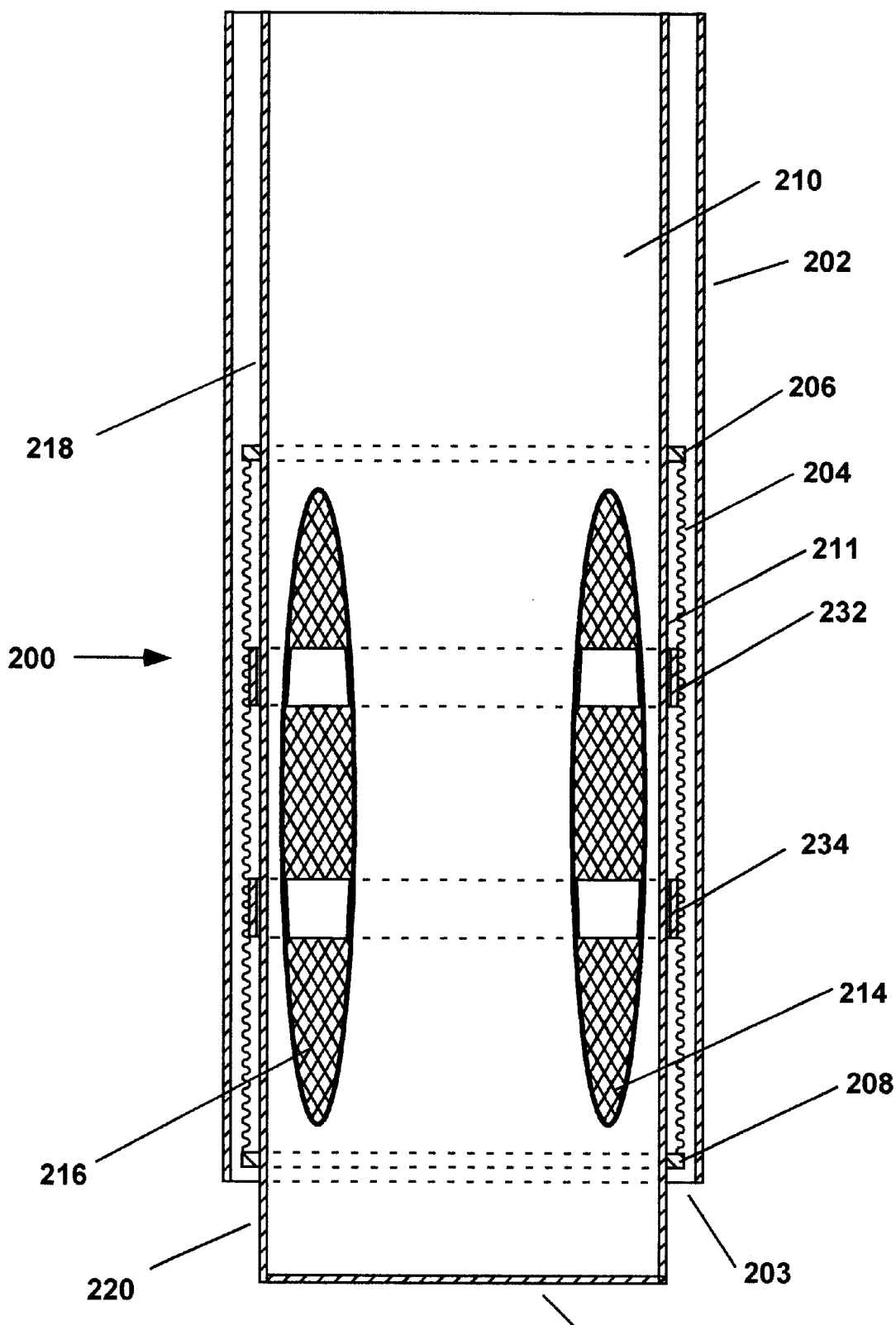
FIG. 2 is a cross-sectional side view of a second version of the waste water filter of the present invention.

FIG. 2 shows a second version of the waste water filter 200. In this version, the filter enclosure includes a pair of second supports 232 and 234. Second filter supports may be included for the purpose of maintaining a small gap between the filter surface 204 and the filter support 210.

Figure 3:
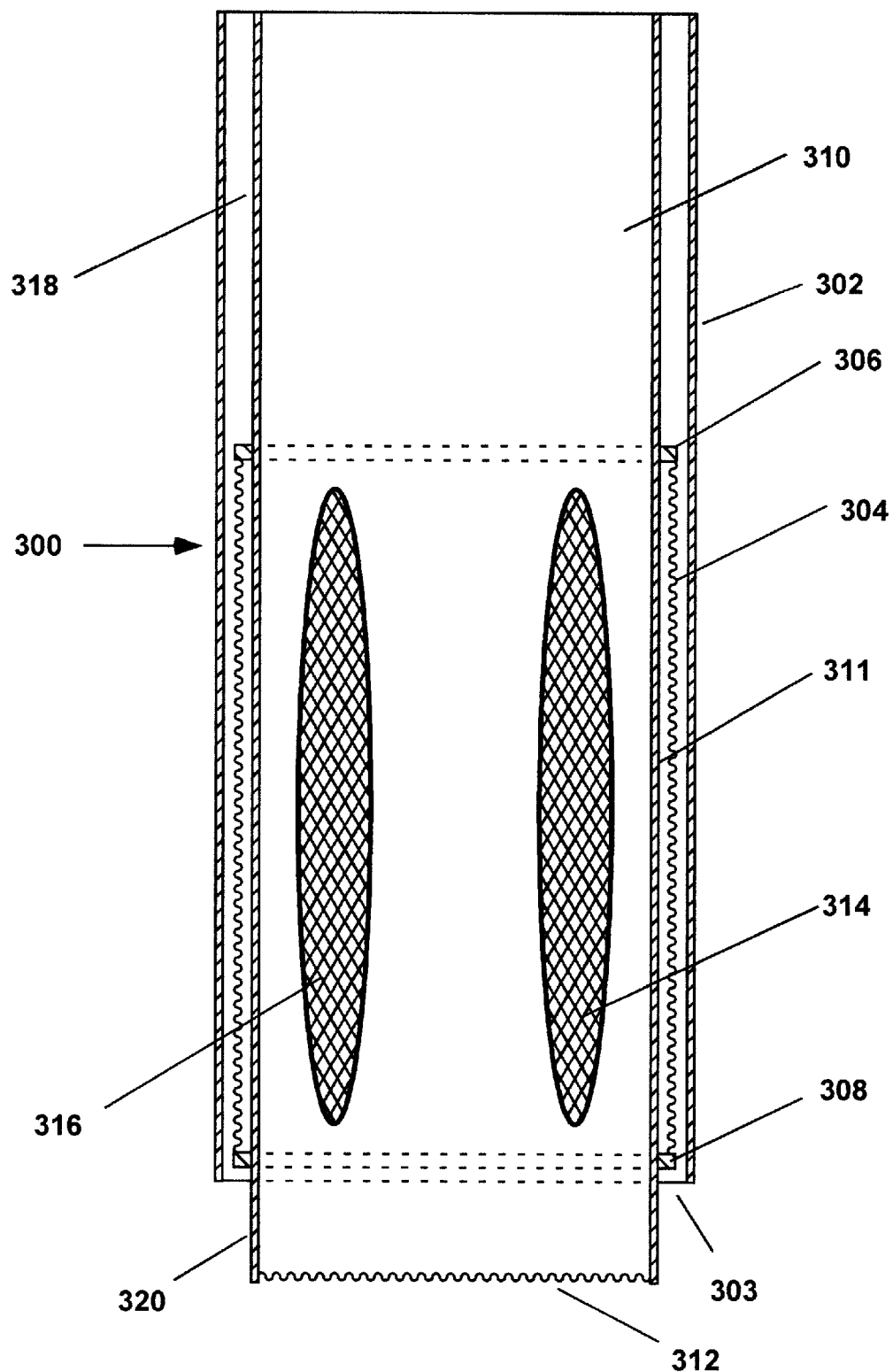
FIG. 3 is a cross-sectional side view of a third version of the waste water filter of the present invention.

FIG. 3 shows a third version of the waste water filter 300. In this version, the bottom panel 312 of the filter enclosure includes a filter surface for allowing the entry of filtered waste water into the interior of the filter enclosure. The bottom filter surface also aids the removal of the filter enclosure from the septic tank, as all water within the enclosure will exit quickly as the enclosure is raised. This type of bottom could be used on any version of the filter.

Figure 4:
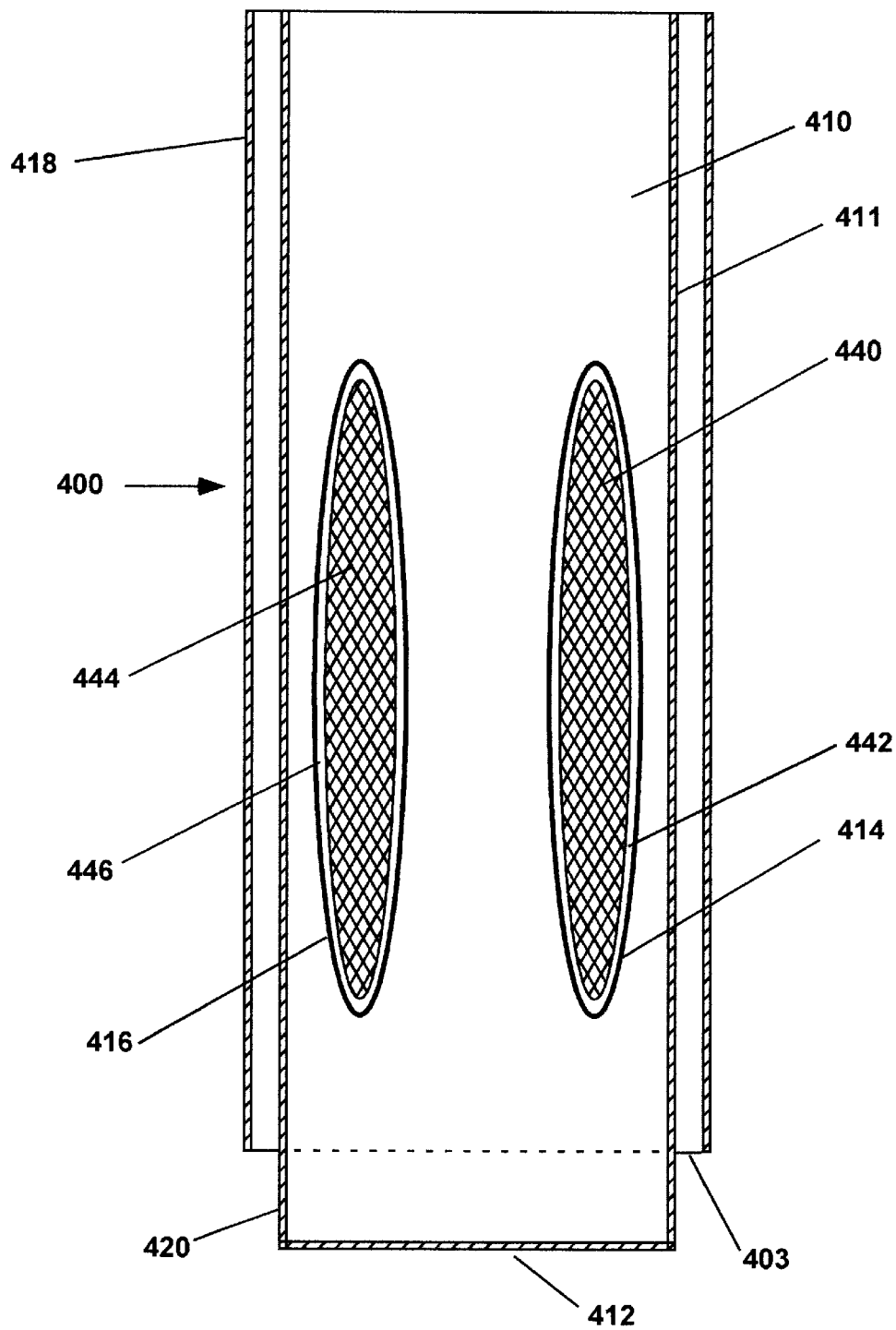
FIG. 4 is a cross-sectional side view of a fourth version of the waste water filter of the present invention.

FIG. 4 shows a fourth version of the waste water filter 400. In this version, the use of a filter surface comprising an upstanding peripheral wall, as was shown used in FIGS. 1–3, is replaced with vertical filter surface panels 440 and 444. Filter surface panels 440 and 444 are supported and by the adjacent filter support 410 and retained within openings 414 and 416 within the filter support. In particular, filter surface panel 440 includes a peripheral seal 442 which allows the filter surface 400 to be securely retained within the opening 414. The seal 442 provides retention along the entire periphery of the opening 414. Filter surface panel 444 is similarly supported within opening 416. Through the secure retention of the filter surfaces within the openings of the filter support, the filter surfaces are reinforced by the adjacent filter support so that the filter surfaces cannot collapse inwardly or become detached from the filter support.

Figure 5:
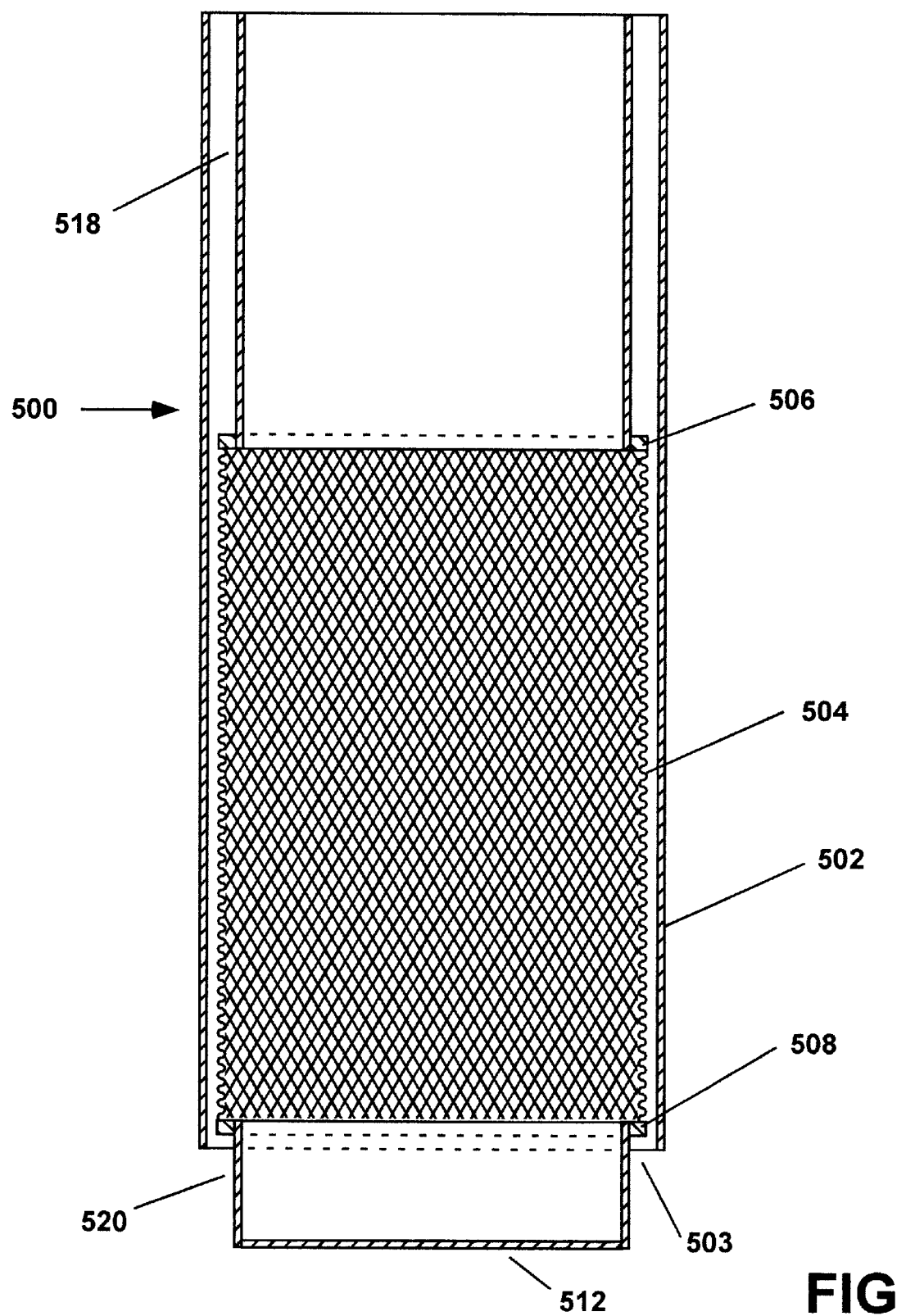
FIG. 5 is a cross-sectional side view of a fifth version of the waste water filter of the present invention.

FIG. 5 shows another version of the waste water filter 500 of the present invention. In this version, the filter enclosure includes a vertical peripheral wall having a top end and bottom end which are separated by top, bottom and center wall sections. The top section 518 and bottom section 520 of the filter enclosure comprise the filter support of the enclosure. The top and bottom sections of the filter enclosure are separated by an opening which is the center section. The center section includes a filter surface 504 disposed within the opening which separates the top and bottom sections. The top section 518 and bottom section 520 are impervious to the passage of water and are disposed adjacent to, and within top and bottom rings 506 and 508 of the filter surface 504. Accordingly, the top and bottom sections provide support to the filter surface through rings 506 and 508 to prevent the inward collapse of the filter surface.

Figure 6:
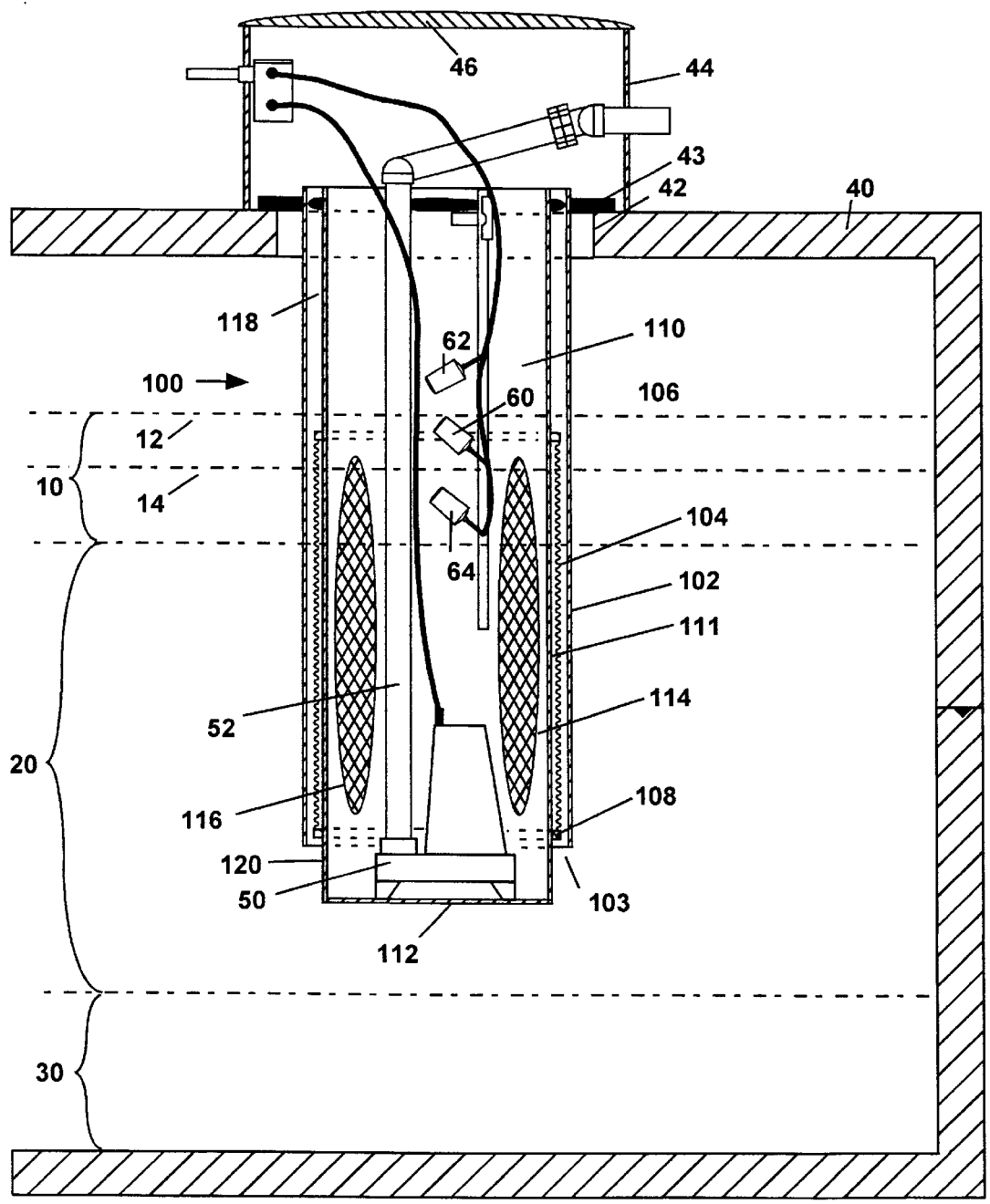
FIG. 6 is a cross-sectional side view of the first version of the waste water filter of the present invention disposed within a septic tank shown with a pump.

FIG. 6 shows the proper placement of the waste water filter of the present invention within a septic tank 40. Disposed within the filter enclosure is a pump 50. In this figure, the waste water filter 100 from FIG. 1 is shown. It is understood that any of the previously described versions of the waste water filter of the present invention could similarly have been shown.

In greater detail FIG. 6 shows a septic tank 40 which includes three waste layers including a top scum layer 10, a relatively clear layer 20, and a bottom sludge layer 30. Waste water filter 100 is supported within an opening 42 within the upper wall of the septic tank 40 by a ring support 43 or other suitable supporting structure. Disposed above the opening is a riser 44 which includes a cover 46. An incremental discharge pump 50 is disposed within the filter enclosure for discharging filtered waste water effluent from the interior of the filter enclosure to a sand filter or drain field via outlet pipe 52. A float switch 60 controls the pump operation. The system further includes a high level alarm switch 62 and a low level alarm/redundant off switch 64.

Pump operation typically begins as the water level within the septic tank reaches a desired level such as is shown by water level 12. Deactivation of the pump occurs as the water drops to a desired level such as is shown at water level 14. The float switch 60 is positioned so that pump operation is activated and deactivated at these desired levels.

During operation of the pump 50, filtered waste water within the filter enclosure 110 enters the pump from where it is discharged through outlet pipe 52. The draw down of water within the filter enclosure interior results in higher water pressure outside of the filter enclosure than within the filter enclosure interior due to the higher water elevation outside the filter enclosure.

This pressure difference, in combination with suction forces that were caused by pump operation draws unfiltered waste water into the filter shield interior through the annular inlet located along the interior surface of the peripheral wall of the open bottom shield. This unfiltered waste water moves through the cylindrical vertical wall of the filter surface 104 and proceeds through the openings 114 and 116 of the filter support. The entry of unfiltered waste water into the filter continues at a rapid rate until the water level within the filter enclosure is at an equal height to the level outside the filter. Further entry of waste water into the filter occurs at a slower rate as the level of the waste water within the entire tank rises to a selected level as was shown at 12. Once the water within the tank again reaches the level 12, the pump will again be activated and will operate until the water level lowers to the selected level as was shown at 14.

The location and size of the annular inlet ensures that the water entering into the filter will move at a relatively slow speed to minimize the solids which can be carried by the incoming water into the filter shield interior. Additionally, the annular inlet location and size further ensures that the speed of the incoming water is also minimized so as to have a minimal force which will be applied to the filter surface.

The filter surface as shown in this figure as well as in FIGS. 1–3 is a cylindrical vertical wall which is positioned around the filter support in such a manner that a gap is maintained between the filter surface and the filter support. In normal operation of the filter, the gap will continue to exist even as incoming water contacts the filter surface. In these conditions the filter support provides support to the filter surfaces through rings such as are shown at 106 and 108 which attach the filter surface to the filter support. This gap allows incoming water to first proceed into the shield interior through the inlet 103 into the gap between the shield interior surface and the filter surface. Subsequently, the water will pass through the filter surface at any point on the filter surface and then proceed to an opening through the gap existing between the filter surface and the filter support. The gap, so located, ensures that the entire filter surface will provide filtering to the incoming waste water. The large filtering surface also ensures that water entering the inlet 103 will slow considerably and likely precipitate any solids that were being carried into the filter. These solids will exit out the inlet along with any other solids that may have accumulated onto the filter surface previously. This aspect of the design provides self cleaning characteristics to the filter.

After a period of prolonged operation, the filter surface will develop a small accumulation of solids. This accumulation will decrease the efficiency of filtering and will result in water entering into the shield having a small amount of built up surfaces on the filter surface on which to contact as the water proceeds through the filter surface into the filter enclosure. The force of this water will cause the filter surface to collapse inwardly away from the shield. The filter support allows only a small amount of inward collapse of the filter surface, typically only at the center of the filter surface. Accordingly, the gap between the filter surface and the filter support will remain for most of the filter surface and preserve an operational efficiency for the filter which is only slightly diminished.

Although a pump is shown in this figure, it is understood that a dosing siphon could also have been used within the filter enclosure.

The second supports 232 and 234 as are shown in FIG. 2 essentially prohibits any inward collapse of the filter surface and preserves the gap between the filter surface and the filter support.

The versions of the waste water filter which are shown in FIGS. 4 and 5 utilize a different type of filter support than was shown in FIGS. 1–3. In both of the versions shown in FIG. 4 and 5, a filter support is utilized which provides support only along the edges of the filter surfaces. Although these types of filter supports do not provide all of the advantages offered by the versions of FIGS. 1–3, in many instances this amount of support will be sufficient. This would be particularly true in the filtering of waste water having a low solids content, or when a dosing siphon is used for the incremental discharge of waste water.

Back flushing of any of the versions of the waste water filter is a simple process of applying pressurized water into the filter enclosure. This water will exit the filter enclosure and proceed out the filter inlet. Solids accumulated on the filter surface will become dislodged and will precipitate or be carried out the inlet during the process.

It is understood that various modifications and changes in form or detail could readily be made without departing from the spirit of the invention. It is therefore intended that the invention be not limited to the exact form and detail herein shown and described, nor to anything less than the whole of the invention herein disclosed and hereinafter claimed.

I claim:

1. A waste water filter for use within a septic tank comprising:

a shield including an upstanding peripheral wall, the peripheral wall defining a shield interior within the shield;

the shield further including an inlet opening for allowing the entry of wastewater into the shield interior;

a filter enclosure disposed within the shield interior at a spaced apart distance from the shield; the filter enclosure including an upstanding peripheral wall, a top end, and a bottom end; wherein the bottom end includes a bottom panel for preventing the passage of unfiltered waste water into filter enclosure;

the filter enclosure further including at least one flexible filter surface disposed intermediate the top and bottom ends of the filter enclosure for allowing the passage of water while restricting the passage of solids;

the filter enclosure further including a filter support disposed intermediate the top and bottom ends of the filter enclosure; wherein the filter support is adjacent to the filter surface and provides a supporting reinforcement surface for the filter surface during the filtering of waste water to prevent the filter surface from collapsing inwardly away from the shield; and and wherein the filter support includes at least one opening therein for the passage of filtered waste water into filter enclosure;

an outlet disposed within the filter enclosure for discharging filtered water; and wherein the entire waste water filter is adapted for use within a septic tank and is separable from a septic tank within which the waste water filter may be disposed.

2. The waste water filter of claim 1, wherein the filter surface is disposed in a substantially vertical orientation and the filter support is disposed inside of the filter surface within the filter enclosure.

3. The waste water filter of claim 2, further including a second filter support intermediate the filter support and the filter surface for maintaining a distance between the filter support and the filter surface.

4. The waste water filter of claim 1, wherein the filter enclosure comprises a filter surface including a peripheral vertical wall; and wherein the filter support includes a peripheral vertical wall disposed within the filter surface within the filter enclosure.

5. The waste water filter of claim 1, wherein each filter surface is disposed within the opening and supported along the periphery of the opening.

6. The waste water filter of claim 1, wherein the filter support includes a plurality of openings.

7. The waste water filter of claim 1, wherein the shield includes a substantially open bottom; and wherein the substantially open bottom is an inlet for the entry of unfiltered waste water into the shield interior.

8. The waste water filter of claim 1, wherein the bottom panel includes a filter surface for allowing the passage of filtered waste water into the filter enclosure through the bottom panel.

9. The waste water filter of claim 1, further including discharging means in fluid communication with the outlet.

10. The waste water filter of claim 9, wherein the discharging means is a pump.

11. A waste water filter for use within a septic tank comprising:

a shield including an upstanding peripheral wall, the peripheral wall defining a shield interior within the shield;

the shield further including an inlet opening for allowing the entry of wastewater into the shield interior;

a filter enclosure disposed within the shield interior at a spaced apart distance from the shield; the filter enclosure including an upstanding peripheral wall, a top end, and a bottom end; wherein the bottom end includes a bottom panel for preventing the passage of unfiltered waste water into filter enclosure;

wherein the filter enclosure further includes a vertical peripheral wall separated into top, bottom, and center wall sections; wherein the top wall section begins at the top end of the filter enclosure and is disposed toward the center wall section, and bottom wall section begins at the bottom end of the filter enclosure and is disposed toward the center wall section; and wherein the center wall section is separated from the top and bottom ends by the top and bottom wall sections; and wherein the center wall section includes at least one flexible filter surface for allowing the passage of water restricting the passage of solids;

the filter enclosure further including a filter support disposed intermediate the top and bottom ends of the filter enclosure; wherein the filter support is adjacent to the filter surface of the center wall section and provides a supporting reinforcement surface for the filter surface during the filtering of waste water to prevent the filter surface from collapsing inwardly away from the shield; and an outlet disposed within the filter enclosure for discharging filtered waste water; and wherein the entire waste water filter is adapted for use within a septic tank and is separable from a septic tank within which the waste water filter may be disposed.

12. The waste water filter of claim 11, wherein the filter support comprises the top and bottom sections.

13. The waste water filter of claim 11, wherein the top and bottom wall sections are impervious to the passage of water.

14. The waste water filter of claim 11, wherein the filter support additionally comprises vertical support sections intermediate the top and bottom wall sections that connect the top and bottom sections.

15. The waste water filter of claim 11, wherein the shield includes a substantially open bottom; and wherein the substantially open bottom is an inlet for the entry of unfiltered waste water into the shield interior.

16. The waste water filter of claim 11, further including discharging means in fluid communication with the outlet.

17. The waste water filter of claim 16, wherein the discharging means is a pump.

* * * * *